United States Patent Office 3,553,210
Patented Jan. 5, 1971

---

3,553,210
3-METHYL - 8 - PHENYLPYRAZOLO[4,3-e][1,4]DI-AZEPIN-5(1H)-ONE, 7-OXIDE COMPOUNDS
Ivan C. Nordin, Ann Arbor, Mich., assignor to Parke, Davis & Company, Detroit, Mich., a corporation of Michigan
No Drawing. Filed Dec. 16, 1968, Ser. No. 784,261
Int. Cl. C07d 53/02
U.S. Cl. 260—239.3                             2 Claims

ABSTRACT OF THE DISCLOSURE

3 - methyl-8-phenylpyrazolo[4,3-e][1,4]diazepin-5(1H)-one, 7-oxide compounds, substituted in the 1-position by methyl or ethyl and optionally in the 4-position by methyl; salts thereof; and their production by (a) reacting a 5 - benzoyl-4-[2-(hydroxylamino)acetamido]-3-methylpyrazole with a strong acid, (b) reacting a 3-methyl - 8 - phenylpyrazolo[4,3-e][1,4]diazepin-5(1H)-one with an oxidizing agent, and (c) reacting one of the 4-unsubstituted 3 - methyl-8-phenylpyrazolo[4,3-e][1,4]diazepin-5(1H)-one, 7-oxides with a methylating agent in the presence of a base. The compounds of the invention are useful as anticonvulsant and antianxiety agents.

---

The present invention relates to a new heterocyclic nitrogen compounds that are useful as pharmacological agents and to methods for their production. More particularly, the invention relates to new 3-methyl-8-phenylpyrazolo-[4,3-e][1,4]diazepin-5(1H)-one, 7-oxide compounds having the formula

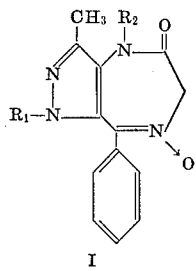

I and to pharmaceutically-acceptable salts thereof; where $R_1$ is methyl or ethyl and $R_2$ is hydrogen or methyl.

In accordance with the invention, 3-methyl-8-phenyl-pyrazolo[4,3-e][1,4]diazepin-5(1H)-one, 7-oxide compounds having the foregoing formula are produced by reacting a 5-benzoyl-4-[2-(hydroxylamino)acetamido]-3-methylpyrazole compound having the formula

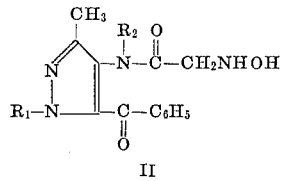

II with a strong acid; where $R_1$ and $R_2$ are as defined above. Any of a number of strong inorganic or organic acids may be used, including hydrochloric, hydrobromic, sulfuric, nitric, phosphoric, methanesulfonic, benzenesulfonic, and p-toluenesulfonic acids. A preferred acid is hydrochloric acid. The reaction is advantageously carried out in a nonreactive solvent medium, which can be water, a lower alkanol, a lower alkanoic acid, or a mixture of these. A preferred solvent is an aqueous lower alkanol. The temperature and duration of the reaction are not critical and may be varied over a wide range, the temperature from about 20° to about 100° C. and the duration from about 15 minutes to about 48 hours. A preferred temperature is one between 70° and 85° C., and at such temperature, the reaction is essentially complete after a period of from one to 3 hours. At least one equivalent of acid per mole of the pyrazole reactant is required, with an excess being preferred.

The 5-benzoyl - 4 - [2-(hydroxylamino)acetamido]-3-methylpyrazole starting materials are prepared by reacting a 5 - benzoyl-4-(2-haloacetamido)-3-methylpyrazole having the formula

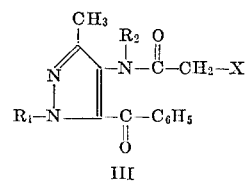

III or an acid addition salt thereof with hydroxylamine. The 5-benzoyl-4-(2-haloacetamido) - 3 - methylpyrazole intermediates are prepared by reacting a 4-amino-5-benzoyl-3-methylpyrazole having the formula

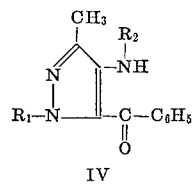

IV with a haloacetyl halide compound having the formula

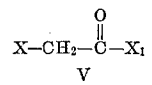

V

The 4-amino-5-benzoyl-3-methylpyrazole intermediates in turn are prepared in a number of ways. A general method for the preparation of the compounds of Formula IV wherein $R_2$ is hydrogen is the following.

A 3 - methylpyrazole - 5 - carboxylic acid having the formula

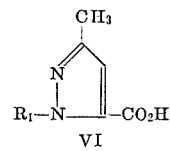

VI is reacted with nitric acid in sulfuric acid to give a 3-methyl - 4 - nitropyrazole-5-carboxylic acid having the formula

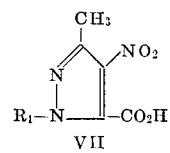

VII which is next reacted with a halogenating agent, such as thionyl chloride or phosphorus pentachloride, and the 3-methyl-4-nitropyrazole-5-carbonyl chloride intermediate obtained is reacted with aluminum chloride and benzene to give a 5-benzoyl-3-methyl-4-nitropyrazole having the formula

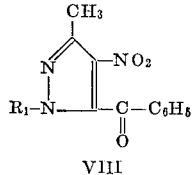

VIII

This 5-benzoyl-3-methyl-4-nitropyrazole intermediate is then reacted with an appropriate reducing agent to reduce the nitro group and give the desired 4-amino-5-benzoyl-3-methylpyrazole intermediate having the formula

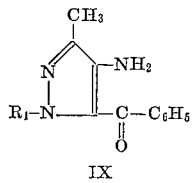

IX

The compounds of Formula IV wherein $R_2$ is methyl can be prepared as follows. The 4-amino-5-benzoyl-3-methylpyrazole of Formula IX above is reacted with p-toluenesulfonyl chloride to give the corresponding 5-benzoyl-3-methyl-4-(p-toluenesulfonamido)pyrazole, and this intermediate is reacted with a methylating agent, such as methyl iodide in the presence of a base to give the corresponding 5-benzoyl-3-methyl-4-(N-methyl-p-toluenesulfonamido)pyrazole intermediate having the formula

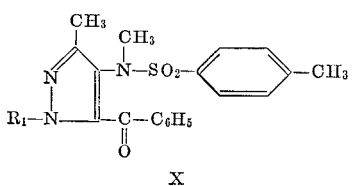

X which is reacted with sodium naphthalide in an ethereal solvent to remove the p-toluenesulfonyl group and give the desired 5-benzoyl-3-methyl-4-(N-methylamino)pyrazole intermediate having the formula

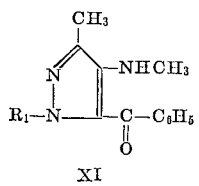

XI

The foregoing procedures are described in detail hereinafter for the preparation of individual compounds. In Formulas III to XI, $R_1$ and $R_2$ have the same meaning as previously given, except where otherwise specified, X is bromine, chlorine, or iodine, and preferably bromine, and $X_1$ is bromine or chlorine.

Also in accordance with the invention, 3-methyl-8-phenylpyrazolo[4,3-e][1,4]diazepin-5(1H)-one, 7-oxide compounds having Formula I above are produced by reacting a 3-methyl-8-phenylpyrazolo[4,3-e][1,4]diazepin-5(1H)-one compound having the formula

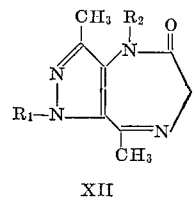

XII with an oxidizing agent, where $R_1$ and $R_2$ have the same meaning as given earlier. The oxidizing agent may be any of a number of organic peracids, including performic, peracetic, perbenzoic, monoperphthalic, pertifluoroacetic, p-nitroperbenzoic, and m-chloroperbenzoic acids. A preferred oxidizing agent, because of its ready availability, handling ease, and relative stability, is m-chloroperbenzoic acid. The reaction is best carried out in a nonreactive solvent medium, which may be a chlorinated hydrocarbon, such as dichloromethane, chloroform, and tetrachloroethane; a lower alkanoic acid, such as acetic acid and propionic acid; and a tertiary amide, such as N,N-dimethylformamide, N,N-dimethylacetamide, and N-methyl-2-pyrrolidinone; as well as mixtures of these. A preferred solvent is dichloromethane. The temperature and duration of the reaction are not critical and may be varied widely, the temperature from about 10° to about 100° C. and the duration from about 10 minutes to about 48 hours. The preferred temperature is one in the range of 20–35° C., and at such temperature, the reaction is complete after a period of 12–18 hours. While equivalent quantities of the pyrazolodiazepinone compound and oxidizing agent may be used, best results are obtained with an excess of the oxidizing agent.

The 3-methyl-8-phenylpyrazolo[4,3-e][1,4]diazepin-5(1H)-one compounds used as starting materials in the foregoing process are prepared by reacting a 4-amino-5-benzoyl-3-methylpyrazole having Formula IV above with a lower alkyl ester of glycine, especially with glycine ethyl ester in hydrochloric acid salt form, in a basic solvent medium in the presence of a basic catalyst, as described in greater detail hereinafter.

Further in accordance with the invention, 3,4-dimethyl-8-phenylpyrazolo[4,3-e][1,4]diazepin-5(1H)-one, 7-oxide compounds having the formula

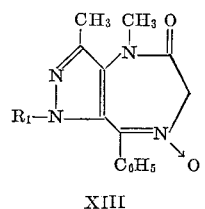

XIII are produced by reacting a 3-methyl-8-phenylpyrazolo-[4,3-e][1,4]diazepin-5(1H)-one, 7-oxide compound having the formula

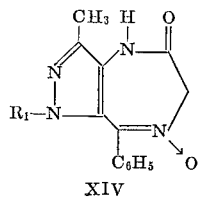

XIV with a methylating agent in the presence of a base; where $R_1$ has the same meaning as given earlier. Examples of methylating agents that may be used are a methyl halide, especially methyl iodide, methyl sulfate, and a methyl hydrocarbon sulfonate, such as methyl methanesulfonate and methyl p-toluenesulfonate. Bases that may be used include alkali metal hydrides, such as sodium hydride and lithium hydride, alkali metal amides, such as sodamide and potassium amide, and alkali metal alkoxides. Of these, sodium hydride is preferred. The reaction is best carried out in an unreactive solvent medium, which may be a tertiary amide, such as N,N-dimethylformamide, N,N-dimethylacetamide, and N-methyl-2-pyrrolidinone; an ether, such as diethyl ether, tetrahydrofuran, and dioxane; an aromatic hydrocarbon, such as benzene and toluene; dimethylsulfoxide; and mixtures of these. Preferred solvents are N,N-dimethylformamide and dimethylsulfoxide. The temperature and duration of the reaction are not critical and may be varied widely, the temperature from 0° to 100° C. and the duration from one to about 48 hours. The reaction can conveniently be carried out at room temperature, that is, without external heating or cooling, and at that temperature is essentially complete after about 4 hours but may optionally be continued for up to 16 hours to insure completeness. Equimolar quantities of reactants and base may be employed, although a slight excess of any one is not harmful. For optimum yields, it is desirable to use a slight excess of both the methylating agent and base.

The free 3-methyl-8-phenylpyrazolo[4,3-e][1,4]diazepin-5(1H)-one, 7-oxide compounds of the invention having Formula I where $R_2$ is hydrogen form pharmaceutically-acceptable salts by reaction with a strong base. Suitable bases for this purpose include alkali metal hydroxides, such as sodium hydroxide, potassium hydroxide, and lithium hydroxide; alkali metal hydrides, such as sodium hydride; alkali metal alkoxides; and alkaline earth metal hydroxides. The free 3-methyl-8-phenyl-pyrazolo[4,3-e][1,4]diazepin-5(1H)-one, 7-oxides and their salts may differ somewhat in certain physical properties, such as solubility in polar solvents, but they are otherwise equivalent for purposes of the invention.

The compounds of the invention are new chemical compounds that are useful as pharmacological agents. As such, they exert a depressant effect upon the central nervous system that is shown by their ability to prevent the occurrence of convulsions in laboratory animals following administration of pentamethylenetetrazole and also by their ability to overcome inhibited behavior in animals placed in an anxiety-producing situation.

The anticonvulsant activity of the compounds of the invention is measured in a standard test that is carried out essentially as described by Chen et al., A.M.A. Archives of Neurology and Psychiatry, vol. 66, pages 329–337 (1951), and vol. 68, pages 498–505 (1952), and by Chen et al., Journal of Pharmacology and Experimental Therapeutics, vol. 103, pages 54–61 (1951). In this test, each of a group of 5 rats is given a measured oral dose of a test compound, dissolved in water or suspended with acacia, followed 30 minutes later by a subcutaneous dose of 93 mg./kg. of pentamethylenetetrazole. This quantity of pentamethylenetetrazole quickly produces convulsions in 98–100% of untreated control rats. The treated animals are then observed visually for 30 minutes following administration of pentamethylenetetrazole, and anticonvulsive activity is judged by noting the time of onset and severity of clonic convulsive seizures and the number of animals completely protected from convulsions. The activity of a test compound at each dosage level is rated as follows: 4+, protection of all 5 rats; 3+, protection of 3 or 4 rats; 2+, protection of one or 2 rats; 1+, delay in onset; 0, no effect.

The results obtained for the free compounds of the invention having Formula I above when tested by the foregoing procedure are shown in the following table, where the compounds are identified by reference to Formula I.

ANTICONVULSANT ACTIVITY

| Compound | | Dose, mg./kg. | Rating |
|---|---|---|---|
| $R_1$ | $R_2$ | | |
| $-C_2H_5$ | $-H$ | 250 | 4+ |
| | | 125 | 4+ |
| | | 63 | 4+ |
| | | 32 | 4+ |
| | | 16 | 0 |
| $-C_2H_5$ | $-CH_3$ | 250 | 4+ |
| | | 125 | 4+ |
| | | 63 | 4+ |
| | | 32 | 0 |
| $-CH_3$ | $-H$ | 250 | 4+ |
| | | 125 | 4+ |
| | | 63 | 4+ |
| | | 32 | 1+ |
| | | 16 | 0 |
| $-CH_3$ | $-CH_3$ | 250 | 4+ |
| | | 125 | 4+ |
| | | 63 | 4+ |
| | | 32 | 1-2+ |
| | | 16 | 0 |

The anti-anxiety activity of the compounds of the invention is determined in a test that measures food consumption by rats that have been placed in an anxiety-producing situation. In this test, newly arrived Holtzman male albino rats are allowed to adjust to the laboratory environment for at least 3 days before testing. When tested, the animals are experimentally naive, are under no condition of dietary deprivation, and weigh about 230 grams. After adjustment to the normal laboratory environment, each of a group of 8 rats is given a measured dose of test compound, dissolved in water or suspended in 0.2% aqueous methocel, by oral intubation and is immediately placed in an individual metabolism cage. A 30-minute period is allowed for absorption of the test compound, and then each animal is given access to a milk preparation in a graduated and calibrated tube. The preparation consists of one part sweetened condensed milk and two parts water. The total milk intake of each animal after one and 2 hours is recorded and compared with that of a group of 8 untreated control animals. The animals are also observed for any gross behavioral signs and symptoms. Greater than normal ingestion of milk by the treated animals is regarded as an indication that the test compound, by acting upon the inhibitory brain systems, has suppressed the natural tendency of rodents to become immobilized in a novel, anxiety-producing situation, as represented in the test by the isolation of the metabolism cage. A given dose of test compound is considered active if it causes a mean amount of ingestion greater than 5.0 ml. per animal at the end of the first hour of the test. During this same period, the untreated controls normally consume between 2.0 and 4.0 ml. of milk.

The anti-anxiety activities of the free compounds of the invention having Formula I, as determined by the foregoing procedure, are shown in the following table, where the compounds are again identified by reference to Formula I. The table also shows the activity data obtained for diazepam and chlordiazepoxide, which are known to be clinically useful for the treatment of anxiety states. The demonstration of activity for diazepam and chlordiazepoxide indicates the validity of the test procedure for determining anti-anxiety activity.

ANTI-ANXIETY ACTIVITY

| Compound | | Dose, mg./kg. | Milk intake after 1 hour, ml. |
|---|---|---|---|
| $R_1$ | $R_2$ | | |
| $-C_2H_5$ | $-H$ | 40 | 11.3 |
| | | 20 | 8.0 |
| | | 10 | 7.4 |
| | | 5 | 5.5 |
| | | 2.5 | 5.8 |
| | | 1.25 | 5.9 |
| $-C_2H_5$ | $-CH_3$ | 40 | 5.1 |
| | | 20 | 5.2 |
| | | 10 | 5.4 |
| $-CH_3$ | $-H$ | 40 | 6.1 |
| | | 20 | 4.4 |
| $-CH_3$ | $-CH_3$ | 40 | 5.3 |
| | | 20 | 7.3 |
| | | 10 | 4.7 |
| Diazepam | | 40 | 10.7 |
| | | 20 | 12.1 |
| | | 10 | 7.4 |
| | | 5 | 7.1 |
| | | 2.5 | 8.0 |
| Chlordiazepoxide | | 40 | 10.7 |
| | | 20 | 11.4 |
| | | 10 | 8.1 |
| | | 5 | 4.7 |

The compounds of the invention are preferably administered orally, as indicated above, although parenteral administration can also be used. They can be combined with either a solid or liquid carrier or diluent and made available in varying amounts in such pharmaceutical forms as tablets, capsules, powders, and aqueous and non-aqueous suspensions and solutions.

The invention is illustrated by the following examples.

To a solution prepared by dissolving 56 g. of hydroxylamine hydrochloride and 81 g. of 50% aqueous sodium hydroxide in 300 ml. of water and 900 ml. of ethanol is added 107 g. of 5-benzoyl-4-(2-bromoacetamido)-1-ethyl-3-methylpyrazole hydrobromide, and the resulting mixture is stirred at room temperature for 42 hours and then evaporated to dryness. To the residue, which contains 5-benzoyl - 4 - [2 - (hydroxylamino) - acetamido]-1-ethyl-3-methylpyrazole, is added one liter of water, 400 ml. of ethanol, and 200 ml. of concentrated hydrochloric acid. The resulting solution is heated under reflux for 30 minutes, concentrated to a volume of about one liter, and made strongly basic with 30% aqueous ammonia. The basic mixture is extracted with ethyl acetate, and the ethyl acetate extract is washed with water, dried, and evaporated to give 1-ethyl-4,6-dihydro-3 - methyl - 8 - phenylpyrazolo-[4,3-e][1,4]diazepin - 5(1H) - one, 7-oxide; M.P. 198–199.5° C., following crystallization from ethanol.

In a similar manner to the above, from 104 g. of 5-benzoyl - 4-(2-bromoacetamido)-1,3-dimethylpyrazole hydrobromide, there is obtained 4,6-dihydro-1,3-dimethyl-8-phenylpyrazolo[4,3-e][1,4]diazepin-5(1H)-one, 7 - oxide; M.P. 242–242.52 C., following successive crystallizations from ethanol-pentane and acetonitrile.

The 5 - benzoyl - 4 - (2 - bromoacetamido) - 1 - ethyl-3-methylpyrazole hydrobromide starting material is prepared according to the following procedure.

To a stirred mixture of 35 ml. of 90% nitric acid and 60 g. of fuming sulfuric acid (23% sulfur trioxide) is added in portions, at such a rate so as to maintain the temperature at about 70° C., 29 g. of 1-ethyl-3-methyl-pyrazole-5-carboxylic acid, and after addition is complete, the mixture is heated at 95–100° C. for 3 hours, cooled, and poured into ice water. The solid 1-ethyl-3-methyl-4-nitropyrazole-5-carboxylic acid that precipitates is isolated, washed with ice water, and dried; M.P. 157–160° C., following crystallization from ethyl acetate.

A mixture consisting of 30 g. of 1-ethyl-3-methyl-4-nitropyrazole-5-carboxylic acid, 20 g. of thionyl chloride, 3.0 ml. of N,N - dimethylformamide, and 200 ml. of toluene is stirred and heated at 95° C. for 2 hours, then cooled, and poured into about 200 ml. of ice water. The aqueous mixture is stirred for 10 minutes, and the toluene layer is separated, washed well with 10% aqueous potassium carbonate, dried, and evaporated. The residue, which is 1-ethyl-3-methyl-4-nitropyrazole-5-carbonyl chloride, is dissolved in 50 ml. of benzene, and the solution is added to a suspension of 27 g. of powdered anhydrous aluminum chloride in 170 ml. of benzene. The reaction mixture is stirred and heated under reflux for 3 hours, cooled, and poured into ice water. The benzene layer is separated, washed with water and with 100 ml. of 1 N aqueous sodium hydroxide, dried, and evaporated to give 5-benzoyl-1-ethyl-3-methyl-4-nitropyrazole; M.P. 52° C., following crystallization from ethyl acetate-petroleum ether.

A mixture consisting of 26 g. of 5-benzoyl-1-ethyl-3-methyl-4-nitropyrazole, 0.5 g. of Raney nickel, and 150 ml. of methanol is shaken with hydrogen at an initial pressure of 50 lbs./in.$^2$ until 3 molecular equivalents of hydrogen are taken up. The catalyst is then removed by filtration, and the filtrate is evaporated under reduced pressure to give 4-amino-5-benzoyl - 1 - ethyl - 3 - methyl-pyrazole, isolated as an oil that is suitable for use without further purification. The hydrochloride salt, monohydrate, M.P. 175–177° C., is prepared by treating the free base in isopropyl alcohol with excess hydrogen chloride, adding ether to the resulting mixture, cooling, and isolating the precipitated salt.

To a solution of 13 g. of 4-amino-5-benzoyl-1-ethyl-3-methylpyrazole in 250 ml. of ethyl acetate heated under reflux is added dropwise 22 g. of bromoacetyl bromide, and the resulting mixture is heated under reflux for one hour. After standing at room temperature overnight, there is obtained from this mixture of solid precipitate of the desired 5-benzoyl-4-(2-bromoacetamido)-1-ethyl - 3-methylpyrazole starting material, which is isolated, washed with ethyl acetate and with ether, and crystallized from isopropyl alcohol-ether; M.P. 220–224° C.

The 5 - benzoyl - 4 - (2 - bromoacetamido) - 1,3 - dimethylpyrazole hydrobromide is obtained in a similar manner by substituting 1,3-dimethylpyrazole-5-carboxylic acid for the 1-ethyl-3-methylpyrazole-5-carboxylic acid in the first reaction described above and then carrying out the successive reactions with nitric acid, thionyl chloride, benzene and aluminum chloride, hydrogen in the presence of Raney nickel, and bromoacetyl bromide.

Example 2

A solution of 28 g. of 5-benzoyl-4-(2-bromo-N-methyl-acetamido)-1-ethyl-3-methylpyrazole in 200 ml. of ethanol is added to an aqueous solution of hydroxylamine prepared by dissolving 21.3 g. of hydroxylamine hydrochloride in a mixture of 24.5 g. of 50% aqueous sodium hydroxide and 120 ml. of water. The resulting mixture is stirred at room temperature for 19 hours and is then concentrated under reduced pressure to a volume of about 100 ml. The residue, which crystallizes upon standing, is mixed with 100 ml. of water, and the aqueous mixture is cooled to give solid 5-benzoyl-1-ethyl-4[2-(hydroxyl-amino)-N-methylacetamido]-3-methylpyrazole, which is collected, dried, and dissolved in 150 ml. of isopropyl alcohol. This solution is made strongly acid with isopropanolic hydrogen chloride, and the acidic solution is heated under reflux for 2 hours and then evaporated under reduced pressure. The residue is dissolved in ethyl acetate, and the solution obtained is washed with saturated aqueous sodium bicarbonate, dried, and evaporated to give 1 - ethyl - 4,6 - dihydro - 3,4 - dimethyl - 8 - phenyl-pyrazolo[4,3-e][1,4]diazepin-5(1H)-one, 7-oxide; M.P. 145.5–147.5° C., following successive crystallizations from ethanol and ethyl acetate.

The 5 - benzoyl - 4 - (2-bromo - N - methylacetamido)-1-ethyl-3-methylprazole starting material is prepared as follows.

A mixture consisting of 9.2 g. of 4-amino-5-benzoyl-1-ethyl-3-methylpyrazole, 8.5 g. of p-toluenesulfonyl chloride, and 150 ml. of pyridine is stirred and heated under reflux for 90 minutes, evaporated under reduced pressure, cooled, and diluted with 300 ml. of ice water. After 2.5 hours at room temperature, the solid 5-benzoyl-1-ethyl-3-methyl - 4 - (p-toluenesulfonamido)pyrazole that precipitates is isolated, washed with water, and dried.

To a stirred mixture of 2.0 g. of 50% sodium hydride in mineral oil dispersion and 30 ml. of N,N-dimethylformamide at room temperature is added in portions 13.5 g. of 5-benzoyl-1-ethyl-3-methyl-4-(p-toluenesulfonamide) pyrazole. The resulting mixture is stirred for 30 minutes, 8.8 g. of dimethyl sulfate is added dropwise, and stirring is continued at room temperature for 2 hours. The mixture is then concentrated under reduced pressure and diluted with ethyl acetate. The ethyl acetate solution is washed with water, with 1 N sodium hydroxide, and with saturated aqueous sodium chloride, dried, and evaporated, and the residue triturated with petroleum ether to give 5 - benzoyl - 1 - ethyl - 3 - methyl - 4 - (N - methyl - p-toluenesulfonamido)pyrazole.

A mixture consisting of 2.3 g. of sodium, 13 g. of naphthalene, and 150 ml. of 1,2-dimethoxyethane is stirred under nitrogen at room temperature for 90 minutes, and to the resulting solution is added a solution of 12 g. of 5-benzoyl-1-ethyl-3-methyl-4-(N - methyl - p - toluenesulfonamido)pyrazole in about 100 ml. of 1,2-dimethoxyethane. The mixture is stirred at room temperature for 2 hours and is then cautiously treated with about 35 ml. of water and diluted with an equal volume of ethyl acetate. The aqueous phase is discarded, and the organic phase is washed with saturated aqueous sodium chloride and extracted with 200 ml. of 1 N hydrochloric acid. The acidic aqueous extract is made strongly alkaline with 30% aqueous sodium hydroxide, and the alkaline mixture is extracted with ether. The ether extract is washed with water, dried, and avaporated to give 5-benzoyl-1-ethyl-3-methyl-4-(N-methylamino)pyrazole, isolated as an oil that is used in the following reaction without further purification.

A solution of 46.2 g. of 5-benzoyl-1-ethyl-3-methyl-4-(N-methylamino)pyrazole in 300 ml. of ethyl acetate is cooled to 10° C., 39.7 g. of bromoacetyl bromide is added, and the resulting mixture is stirred at room temperature for 15 minutes. It is then poured over a mixture of ice and diluted with aqueous sodium hydroxide. The organic phase is separated, and the aqueous phase is extracted twice with ethyl acetate. The ethyl acetate extracts are combined with the previously separated organic phase, and the combined solution is dried and evaporated to give the desired 5-benzoyl-4-(2-bromo-N-methylacetamido)-1-ethyl-3-methylpyrazole starting material.

Example 3

To a solution of 26.8 g. of 1-ethyl-4,6-dihydro-3-methyl-8-phenylpyrazolo[4,3-e][1,4]diazepin-5(1H)-one in 550 ml. of dichloromethane is added with stirring 22 g. of 85% m-chloroperbenzoic acid. After the initial exothermic reaction subsides, the reaction mixture is kept at room temperature for 16 hours and is then shaken with a solution of 20 go. of sodium bicarbonate in 400 ml. of water. The organic phase is then separated, dried, and evaporated to give 1 - ethyl-4,6-dihydro-3-methyl-8-phenylpyrazolo[4,3-e][1,4]diazepin-5(1H)-one, 7 - oxide; M.P. 198–199.5° C., following 2 crystallizations from ethanol.

The starting material used above is prepared as follows. A mixture consisting of 4.4 g. of 4-amino-5-benzoyl-1-ethyl-3-methylpyrazole, 8.0 g. of glycine ethyl ester hydrochloride, 1.0 ml. of piperidine, and 35 ml. of pyridine is stirred and heated under reflux for 30 hours and then evaporated to dryness under reduced pressure. To the residue is added 50 ml. of water, and the aqueous mixture is extracted with 125 ml. of methylene chloride. The methylene chloride extract is treated with charcoal and anhydrous magnesium sulfate, filtered, and evaporated to give 1 - ethyl - 4,6 - dihydro-3-methyl-8-phenylpyrazolo [4,3-e][1,4]diazepin-5(1H)-one; M.P. 217–219° C., following crystallization from 95% ethanol.

Example 4

Utilizing the procedure described in Example 3 above, the following 3 - methyl - 8 - phenylpyrazolo[4,3-e][1,4]diazepin-5(1H)-one, 7-oxide compounds are obtained from the reactions indicated below:

(a) From the reaction of 35 g. of 4,6-dihydro-1,3-dimethyl - 8 - phenylpyrazolo[4,3-e][1,4]diazepin-5-(1H)-one with 30.8 g. of 85% m-chloroperbenzoic acid in 950 ml. of dichloromethane, there is obtained 4,6-dihydro-1,3-dimethyl-8 - phenylpyrazolo[4,3 - e][1,4] diazepin - 5(1H) - one, 7 - oxide; M.P. 242–242.5° C., following successive crystallizations from ethanol-pentane and from acetonitrile.

(b) From the reaction of 18.5 g. of 1-ethyl-4,6-dihydro-3,4-dimethyl-8-phenylpyrazolo[4,3 - e][1,4]diazepin - 5 (1H) - one with 14.5 g. of 85% m-chloroperbenzoic acid in 250 ml. of dichloromethane, there is obtained 1-ethyl-4,6 - dihydro - 3,4 - dimethyl - 8 - phenylpyrazolo[4,3-e] [1,4]diazepin-5(1H)-one, 7-oxide; M.P. 145.5–147.5° C., following crystallization from ethyl acetate.

The 4,6 - dihydro - 1,3 - dimethyl - 8 - phenylpyrazolo [4,3-e][1,4]diazepin - 5(1H) - one starting material is prepared as follows. A mixture consisting of 9.0 g. of 4-amino - 5 - benzoyl - 1,3 - dimethylpyrazole, 18 g. of glycine ethyl ester hydrochloride, 2.0 ml. of piperidine, and 100 ml. of pyridine is stirred and heated under reflux for 30 hours and then evaporated to dryness under reduced pressure. The residue is shaken with a mixture of 250 ml. of methylene chloride and 100 ml. of water, and the methylene chloride phase is separated, treated with charcoal and anhydrous magnesium sulfate, filtered, and evaporated under reduced pressure to give 4,6-dihydro - 1,3 - dimethyl - 8 - phenylpyrazolo[4,3-e][1,4] diazepin - 5(1H) - one; M.P. 267–270° C., following crystallization from ethanol.

The 1 - ethyl - 4,6 - dihydro - 3,4 - dimethyl - 8 - phenylpyrazolo[4,3-e][1,4]diazepin - 5(1H) - one starting material, M.P. 99–102° C., following several crystallizations from cyclohexane with charcoal treatment, is obtained in a similar manner from the reaction of 4.0 g. of 5-benzoyl-1 - ethyl - 3 - methyl - 4 - (N-methylamino)pyrazole with 8.0 g. of glycine ethyl ester hydrochloride in a mixture of 1.0 ml. of piperidine and 35 ml. of pyridine.

Example 5

To a stirred mixture of 2.4 g. of 56.6% sodium hydride in mineral oil dispersion and 20 ml. of dimethyl sulfoxide is added a solution of 14.2 g. of 1-ethyl-4,6-dihydro-3-methyl - 8 - phenylpyrazolo[4,3-e][1,4]diazepin-5(1H)-one, 7-oxide in 60 ml. of dimethyl sulfoxide while the temperature is maintained below 18° C. The resulting mixture is stirred at 15° C. for 10 minutes and is then treated with 7.8 g. of methyl iodide. The new reaction mixture is stirred at room temperature for 90 minutes, an additional 10 drops of methyl iodide are added, and the mixture is stirred for 30 minutes more. It is then washed with pentane and poured into 600 ml. of ice water. The resulting aqueous mixture is extracted with ethyl acetate, and the ethyl acetate extract is washed with water, dried, and evaporated to give 1-ethyl-4,6-dihydro-3,4 - dimethyl - 8 - phenylpyrazolo[4,3-e][1,4]diazepin-5(1H)-one, 7-oxide; M.P. 145.5–147.5° C., following crystallization from ethyl acetate.

Utilizing the foregoing procedure, from the reaction of 20 g. of 4,6-dihydro-1,3-dimethyl-8-phenylpyrazolo[4,3-e]-[1,4]diazepin-5(1H)-one, 7-oxide with 3.3 g. of 56.6% sodium hydride in mineral oil dispersion in 120 ml. of dimethyl sulfoxide and then with 11.5 g. of methyl iodide, there is obtained 4,6-dihydro-1,3,4-trimethyl-8-phenylpyrazolo[4,3-e[]1,4]diazepin-5(1H)-one, 7-oxide; M.P. 150–152° C., following crystallization from isopropyl alcohol-pentane.

Example 6

1 - ethyl - 4,6 - dihydro - 3-methyl-8-phenylpyrazolo-[4,3-e][1,4]-diazepin-5(1H)-one, 7-oxide (5.6 g.) is stirred with 40 ml. of 0.5 N sodium hydroxide, the resulting mixture is filtered, and the filtrate is subjected to lyophilization. The solid residue obtained is dissolved in 25 ml. of hot N,N-dimethylformamide, and the solution is filtered, cooled, and treated with about 100 ml. of ether to precipitate 1-ethyl-4,6-dihydro-3-methyl-8-phenylpyrazolo[4,3-e][1,4]diazepin-5(1H)-one, 7-oxide, sodium salt, which is isolated, washed with ether, and dried.

In a similar manner, from 5.4 g. of 4,6-dihydro-1,3-dimethyl - 8 - phenylpyrazol[4,3-e]]1,4]diazepin - 5(1H)-one, 7-oxide, there is obtained 4,6-dihydro-1,3-dimethyl-8-phenylpyrazolo[4,3-e][1,4]diazepin - 5(1H)-one, 7-oxide, sodium salt.

Example 7

1 - ethyl - 4,6 - dihydro-3,4-dimethyl-8-phenylpyrazolo-[4,3-e][1,4]diazepin-5(1H)-one, 7-oxide (5.9 g.) is stirred with 40 ml. of 0.5 N sodium hydroxide, the resulting mixture is filtered, and the filtrate is lyophilized. The solid residue obtained is dissolved in about 25 ml. of hot N,N-dimethylformamide, and the solution is filtered, cooled, and treated with about 100 ml. of ether to precipitate 1-ethyl - 4,6-dihydro-3,4-dimethyl-8-phenylpyrazolo[4,3-e]-[1,4]diazepin-5(1H)-one, 7-oxide, sodium salt, which is isolated, washed with ether, and dried.

In a similar manner, 4,6-dihydro-1,3,4-trimethyl-8-phenylpyrazolo[4,3-e][1,4]diazepin-5(1H)-one, 7-oxide, sodium salt is obtained from 5.6 g. of 4,6-dihydro-1,3,4-trimethyl - 8-phenylpyrazolo[4,3-e][1,4]diazepin-5(1H)-one, 7-oxide.

I claim:
1. A member of the class consisting of 3-methyl-8-phenylpyrazolo[4,3-e][1,4]diazepin - 5(1H)-one, 7-oxide compounds having the formula

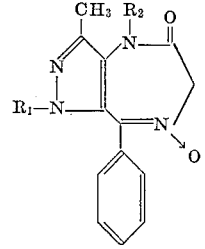

and pharmaceutically-acceptable salts thereof; where $R_1$ is a member of the class consisting of methyl and ethyl and $R_2$ is a member of the class consisting of hydrogen and methyl.

2. A compound according to claim 1 which is 1-ethyl-4,6-dihydro-3-methyl - 8 - phenylpyrazolo[4,3-e][1,4]-diazepin-5(1H)-one, 7-oxide.

References Cited

UNITED STATES PATENTS

| | | | |
|---|---|---|---|
| 3,313,805 | 4/1967 | Bell | 260—239.3 |
| 3,336,296 | 8/1967 | Bell et al. | 260—239.3 |
| 3,371,085 | 2/1968 | Reeder et al. | 260—239.3 |

HENRY R. JILES, Primary Examiner

R. T. BOND, Assistant Examiner

U.S. Cl. X.R.

260—310; 424—273